United States Patent
Panchanathan et al.

(10) Patent No.: US 10,284,593 B1
(45) Date of Patent: May 7, 2019

(54) PROTECTING NEWLY RESTORED CLIENTS FROM COMPUTER VIRUSES

(71) Applicant: EMC Corporation, Hopkinton, MA (US)

(72) Inventors: Balaji Panchanathan, Bangalore (IN); Ganesh Mony, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 66 days.

(21) Appl. No.: 14/597,501

(22) Filed: Jan. 15, 2015

(51) Int. Cl.
*G06F 21/60* (2013.01)
*H04L 29/06* (2006.01)
*G06F 11/14* (2006.01)

(52) U.S. Cl.
CPC ........ *H04L 63/145* (2013.01); *G06F 11/1469* (2013.01)

(58) Field of Classification Search
CPC ........... G06F 11/1453; G06F 17/30997; G06F 17/30156; G06F 17/30468; G06F 17/3033; G06F 11/1451; G06F 11/1458; G06F 11/1469; G06F 21/60; G06F 21/70
USPC ............................................. 726/24; 707/644
See application file for complete search history.

(56) References Cited

U.S. PATENT DOCUMENTS

| | | | |
|---|---|---|---|
| 5,765,173 A * | 6/1998 | Cane ................... | G06F 11/1453 707/640 |
| 6,801,920 B1 * | 10/2004 | Wischinski ............ | G06Q 10/06 |
| 6,859,924 B1 * | 2/2005 | Kroening .................. | G06F 8/60 717/173 |
| 7,051,327 B1 * | 5/2006 | Milius ....................... | G06F 8/65 717/168 |
| 9,088,618 B1 * | 7/2015 | Gridnev ................... | H04L 63/20 |
| 9,128,616 B2 * | 9/2015 | Hayasaka ............. | G06F 3/0608 |
| 2005/0071670 A1 * | 3/2005 | Hafeman ................ | G06F 21/88 726/34 |
| 2005/0131990 A1 * | 6/2005 | Jewell ................. | G06F 11/1464 709/201 |
| 2006/0112314 A1 * | 5/2006 | Soto ..................... | G06F 11/0709 714/38.14 |
| 2007/0283438 A1 * | 12/2007 | Fries .................... | G06F 11/1448 726/24 |
| 2009/0182789 A1 * | 7/2009 | Sandorfi ............. | G06F 11/1453 |
| 2011/0078791 A1 * | 3/2011 | Prakash ........... | G06F 17/30265 726/22 |
| 2011/0176482 A1 * | 7/2011 | Vizor .................. | H04L 12/5695 370/328 |
| 2011/0218966 A1 * | 9/2011 | Barnes .............. | G06F 17/30079 707/645 |
| 2012/0304004 A1 * | 11/2012 | Gould ................. | H04L 61/1511 714/15 |

(Continued)

*Primary Examiner* — William S Powers
(74) *Attorney, Agent, or Firm* — Dergosits & Noah LLP; Todd A. Noah

(57) ABSTRACT

Protecting newly restored clients from computer viruses is described. A system identifies a backed-up version of anti-virus software associated with a backup copy of a data set for a client. The system receives a request to restore the data set for the client. The system determines whether the backed-up version of the anti-virus software comprises a most recent version of the anti-virus software. The system restores the data set for the client based on the most recent version of the anti-virus software in response to a determination that the backed-up version of the anti-virus software does not comprise the most recent version of the anti-virus software.

21 Claims, 4 Drawing Sheets

(56) References Cited

U.S. PATENT DOCUMENTS

| | | | | |
|---|---|---|---|---|
| 2013/0179403 A1* | 7/2013 | Kim | .................... | G06F 11/1458 |
| | | | | 707/654 |
| 2013/0290708 A1* | 10/2013 | Diaz | ....................... | H04L 41/28 |
| | | | | 713/165 |
| 2014/0020104 A1* | 1/2014 | Marinescu | .............. | G06F 21/56 |
| | | | | 726/23 |
| 2014/0181046 A1* | 6/2014 | Pawar | ................. | G06F 11/1484 |
| | | | | 707/654 |
| 2016/0004601 A1* | 1/2016 | Ahn | .................... | G06F 11/1451 |
| | | | | 707/645 |
| 2016/0041885 A1* | 2/2016 | Arai | .................... | G06F 11/1451 |
| | | | | 714/19 |

* cited by examiner

PROTECTING NEWLY RESTORED CLIENTS FROM COMPUTER VIRUSES

BACKGROUND

If a software error corrupts a computer's data set, or if erroneous data updates the data set, a data protection administrator may restore the data set to a previous uncorrupted state that does not include the corrupted or erroneous data. A backup application executes a backup operation either occasionally or continuously to enable this restoration, storing a copy of each desired data set state (such as the values of its data and these values' embedding in the data set's data structures) within dedicated backup files. When the data protection administrator decides to return the data set to a previous state, the data protection administrator specifies the desired previous state by identifying a desired point in time when the data set was in this state, and instructs the backup application to execute a restore operation to restore a copy of the corresponding backup files for that state to the data set.

A virtual machine is a software implementation of a computer that executes programs like a physical machine. A system virtual machine provides a complete system platform which supports the execution of a complete operating system, and usually emulates an existing architecture. Multiple instances of virtual machines lead to more efficient use of computing resources, both in terms of energy consumption and cost effectiveness, known as hardware virtualization, the key to a cloud computing environment. Similar to other data sets, backup copies are made of virtual machine data sets to enable a restoration of the virtual machine data set in the event of corruption or an erroneous update to the virtual machine data set.

DETAILED DESCRIPTION

New variants of computer viruses pose a frequently changing threat to computers. Therefore, a provider of anti-virus software may frequently provide updated versions of the anti-virus software to customers. The customers can use the most recent version of the anti-virus software to protect their computers from the latest computer viruses. If a customer updates a computer with the most recent version of the anti-virus software prior to restoring the computer, the computer may be subsequently restored based on a week-old backup copy of the computer's data set if the computer was backed up one week ago. Therefore, the restored computer will not be restored based on the most recent version of the anti-virus software if the customer received the most recent version of the anti-virus software within the week since the computer was backed up. Such a newly restored computer may be at risk of attacks by the latest computer viruses, attacks which could have been prevented by restoring the computer using the most recent version of the anti-virus software. Computer virus attacks which may occur after a computer is restored and before the computer's anti-virus software is updated may be referred to as day zero attacks. Data centers which execute multiple virtual machines are especially vulnerable to day zero attacks because of the large numbers of virtual machines and the various lengths of time since each of the virtual machines was most recently backed-up.

Embodiments herein protect newly restored clients from computer viruses. A backed-up version is identified of anti-virus software associated with a backup copy of a data set for a client. A request is received to restore the data set for the client. A determination is made whether the backed-up version of the anti-virus software is the most recent version of the anti-virus software. The data set is restored for the client based on the most recent version of the anti-virus software if the backed-up version of the anti-virus software is not the most recent version of the anti-virus software.

For example, a backup application identifies a Jun. 29, 2014, version of anti-virus software while creating a backup copy of a data set for a client. The backup application receives a request to restore the data set for the client. The backup application determines whether the backed-up Jun. 29, 2014, version of the anti-virus software is the most recent version of the anti-virus software. Since the backed-up Jun. 29, 2014, version of the anti-virus software is not the most recent version of the anti-virus software, the backup application restores the data set for the client based on the most recent Jul. 3, 2014, version of the anti-virus software. The backup application insures that the most recent version of the anti-virus software is used to restore a client, even if the backup for the client includes an outdated version of the anti-virus software.

Figure 1:
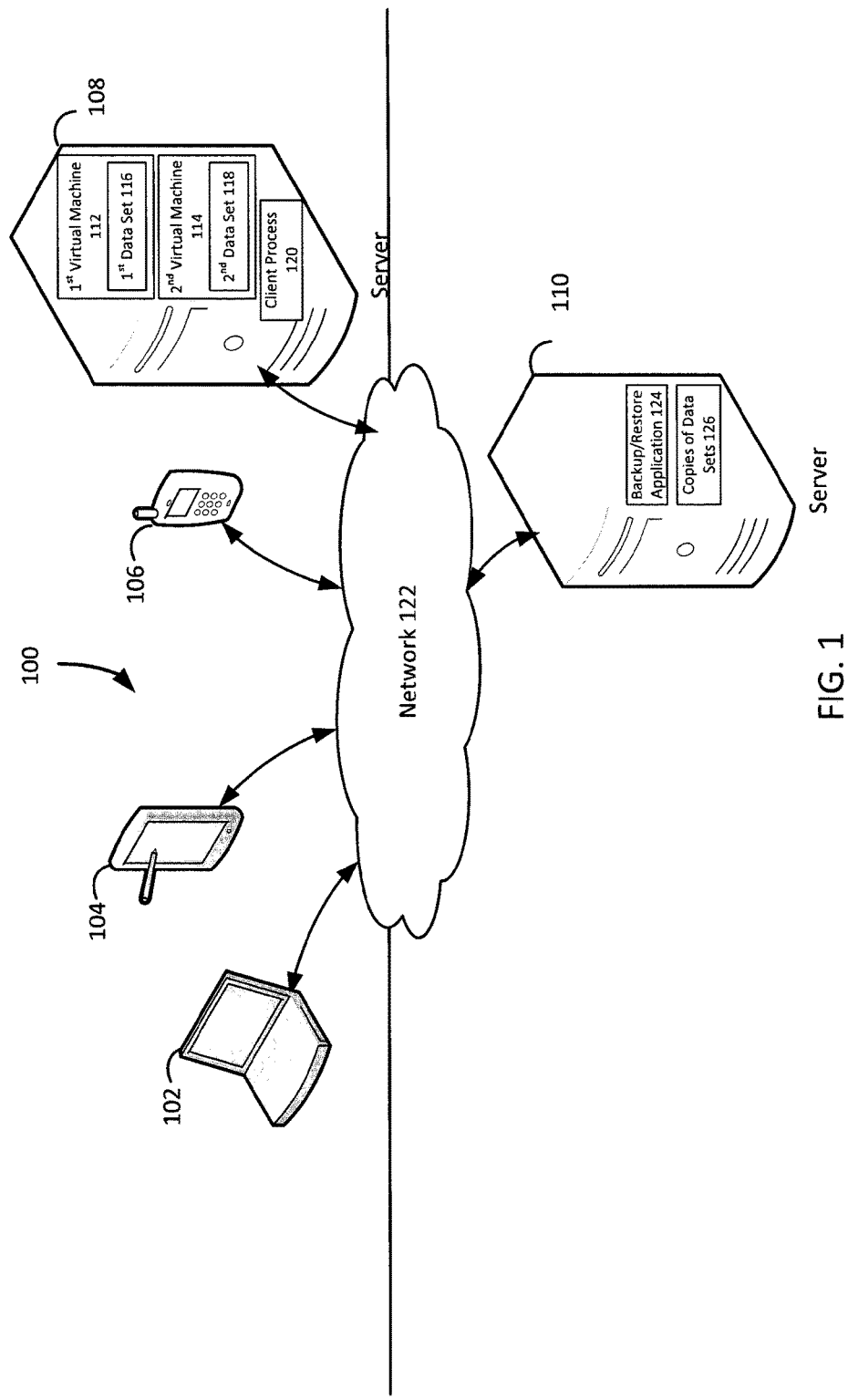
FIG. 1 illustrates a block diagram of an example system for protecting newly restored clients from computer viruses.

FIG. 1 illustrates a block diagram of a system that implements protecting newly restored clients from computer viruses, under an embodiment. As shown in FIG. 1, system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, a third client 106, and a fourth client 108; and a server 110 that may be provided by a hosting company. The first client 102 may be a laptop computer, the second client 104 may be a tablet, the third client 106 may be a mobile telephone such as a smart phone, and the fourth client 108 may be a computer capable of hosting multiple virtual machines, such as a first virtual machine 112 and a second virtual machine 114. The first virtual machine 112 may use a first data set 116, and the second virtual machine 114 may use a second data set 118. The fourth client may also include a client process 120. The clients 102-108 and the server 110 communicate via a network 122. The server 110 includes a backup/restore application 124, and copies of data sets 126. Although FIG. 1 depicts the system 100 with four clients 102-108, one server 110, two virtual machines 112-114, two data sets 116-118, one client process 120, one network 122, one backup/restore application 124, and one copies of data sets 126, the system 100 may include any number of clients 102-108, any number of servers 110, any number of virtual machines 112-114, any number of data sets 116-118, any number of the client processes 120, any number of networks 122, any number of backup/restore applications 124, and any number of copies of data sets 126. The clients 102-108 and the server 110 may each be substantially similar to the system 400 depicted in FIG. 4 and described below. FIG. 1 depicts the backup/restore application 124 and the copies of data sets 126 residing completely on the server 110, but the backup/restore application 124 and the copies of data sets 126 may reside completely on any of the clients 102-108, completely on another server that is not depicted in FIG. 1, or in any combination of partially on the server 110, partially on the clients 102-108, and partially on the other server that is not depicted.

The backup/restore application 124 may protect the data sets used by clients 102-108 by triggering a scheduled backup on each of the clients 102-108 and storing various copies of the data sets in the copies of data sets 126. A data protection administrator may use the backup/restore application 124 to specify a priority for storing copies of data sets on destination nodes, such as storing only on disks, or storing on disks before storing on a combination of disks and tapes. Additionally, a data protection administrator may use the backup/restore application 124 to specify the options for data to be encrypted, deduplicated, and/or compressed while being transmitted from a source, and the options for data to be decrypted and/or decompressed when stored on a destination. Data deduplication significantly reduces backup time by only storing unique daily changes, while always maintaining daily full backups for immediate single-step restore. The transmission of deduplicated backup sends only changed blocks, thereby reducing network traffic. The copies of data sets 126 may be based on checkpoints that the backup/restore application 124 created at regular intervals. The backup/restore application 124 may automatically roll back a copy of a data set to a certain checkpoint during a power up if the preceding shutdown of the corresponding client was abnormal. Furthermore, a data protection administrator may select to execute a manual rollback to a certain checkpoint selected by the data protection administrator.

Data protection administrators may use the backup/restore application 124 to generate a specific policy based on the specific needs of a customer, and reuse that policy for customers with similar needs. For example, a data protection administrator may use the backup/restore application 124 to generate a "gold" policy, a "platinum" policy, and a "silver" policy for VMware® clients. The gold policy can specify to store 2 backup copies for each VMware® client onto a first disk for 6 months, store a clone of the backup copies on a second disk for 1 year, and store a secondary clone of the backup copies on a tape for 5 years. In this example, the data protection administrator that used the backup/restore application 124 to generate the gold policy for a specific set of VMware® clients may later apply another instance of the same gold policy to a different set of VMware® clients. Similarly, the data protection administrator may apply another instance of the same platinum policy to a different set of VMware® clients. The backup/restore application 124 may provide full enterprise level protection of data for all of an enterprise's virtual machines.

The backup/restore application 124 identifies a backed-up version of anti-virus software associated with a backup copy of a data set for a client. For example, the backup/restore application 124 spawns the client process 120 on the fourth client 108, and the client process 120 identifies a Jun. 29, 2014, version of anti-virus software in a specific dat file while the backup/restore application 124 is creating a backup copy of the first data set 116 for the first virtual machine 112 executing on the fourth client 108. The backup copy of the first data set 116 for the first virtual machine 112 may be a deduplicated backup copy of the first data set 116 for the first virtual machine 112. The backup/restore application 124 may create the backup copy of the first data set 116 for the first virtual machine 112 while replicating the first virtual machine 112. Alternatively, the backup/restore application 124 may identify a May 28, 2014, version of anti-virus software after receiving the request to restore the first data set 116 for the first virtual machine 112.

The backup/restore application 124 receives a request to restore a data set for a client. For example, the backup/restore application 124 receives a request to restore the first data set 116 for the first virtual machine 112 executing on the fourth client 108. Although this example describes receiving a request to restore a virtual machine executing on the fourth client 108, the backup/restore application 124 may restore the data sets for any of the different types of clients 102-108.

The backup/restore application 124 determines whether the backed-up version of the anti-virus software is the most recent version of the anti-virus software. For example, the backup/restore application 124 determines whether the backed-up Jun. 29, 2014, version of the anti-virus software in the specifically identified dat file is the most recent version of the anti-virus software. The backup/restore application 124 may determine whether a backed-up version of the anti-virus software is the most recent version of the anti-virus software by identifying the most recent backed-up version of the anti-virus software associated with another backup copy of another data set for another client. For example, the backed-up Jun. 29, 2014, version of the anti-virus software is not the most recent version of the anti-virus software because the backup/restore application 124 identifies a Jul. 3, 2014, version of the anti-virus software in another specific dat file which the backup/restore application 124 created while creating a backup copy of the second data set 118 for the second virtual machine 114 executing on the fourth client 108. The backup/restore application 124 may constantly keep track of the last received version of the anti-virus software used to update the clients 102-108, thereby saving bandwidth and other resources by avoiding the need to download the most recent version of the anti-virus software from the provider of the anti-virus software for each subsequent restore of the clients 102-108. Alternatively, the backup/restore application 124 may determine whether a backed-up version of the anti-virus software is the most recent version of the anti-virus software by receiving the most recent version of the anti-virus software from the provider of the anti-virus software. For example, the backup/restore application 124 accesses a link to the provider of the anti-virus software, determines that the backed-up Jun. 29, 2014, version of the anti-virus software in the specifically identified dat file is not the most recent version of the anti-virus software, and downloads the most recent Jul. 3, 2014, version of the anti-virus software from the provider of the anti-virus software.

If a backed-up version of the anti-virus software is not the most recent version of the anti-virus software, the backup/restore application 124 restores the data set for the client based on the most recent version of the anti-virus software. For example, since the backed-up Jun. 29, 2014, version of the anti-virus software in the specifically identified dat file is not the most recent version of the anti-virus software, the backup/restore application 124 communicates with the client process 120 to restore the first data set 116 for the first virtual machine 112 based on the most recent Jul. 3, 2014, version of the anti-virus software in another specifically identified dat file. If a backed-up version of the anti-virus software is the most recent version of the anti-virus software, the backup/restore application 124 may restore the data set for the client based on the backed-up version of the anti-virus software. For example, if the backed-up Jun. 29, 2014, version of the anti-virus software in the specifically identified dat file is the most recent version of the anti-virus software, the backup/restore application 124 communicates with the client process 120 to restore the first data set 116 for the first virtual machine 112 based on the backed-up Jun. 29, 2014, version of the anti-virus software in the specifically identified dat file.

The backup/restore application 124 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, daily full backups for virtual environments, remote offices, enterprise applications, network access servers, and desktops/laptops. Data deduplication significantly reduces backup time by only storing unique daily changes, while always maintaining daily full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Daily data systems checks ensure recoverability whenever needed. EMC Corporation's Avamar® systems can be deployed in an integrated solution with EMC Corporation's Data Domain® systems for high-speed backup and recovery of specific data types.

The backup/restore application 124 may be EMC Corporation's NetWorker® backup application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environment. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

Figure 2:
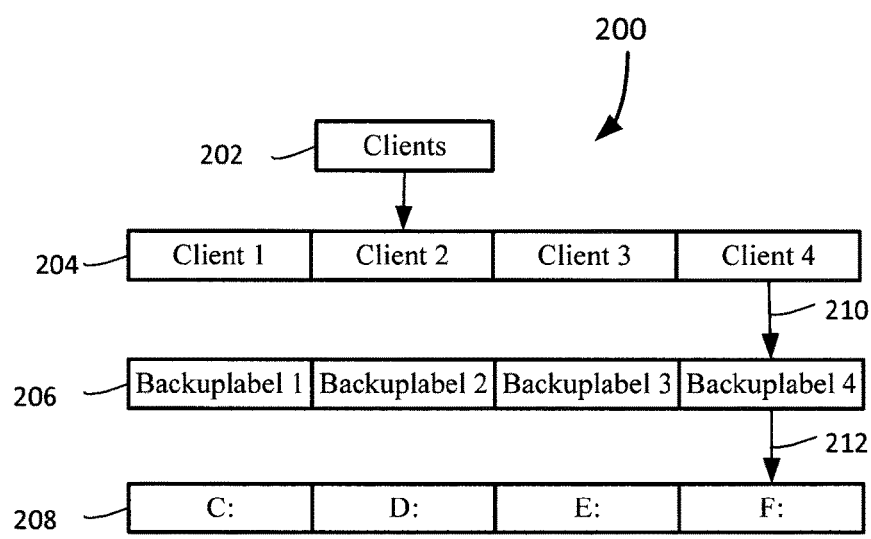
FIG. 2 is a simplified example of a tree structure for chunks of data for protecting newly restored clients from computer viruses, under an embodiment.

FIG. 2 is a simplified example of a tree structure for chunks of data for protecting newly restored clients from computer viruses, under an embodiment. The backup/restore application 124 may use source deduplication, such as variable length deduplication, when creating a backup copy of a data set for a client. Each unit of data that is backed up together may be referred to as a chunk or a data chunk. A client process executing on any of the clients 102-108 may create a hash of a chunk to be backed up and send the hash of the chunk to the backup/restore application 124, which may compare the hash of the chunk to previously received hashes of previously received chunks to determine whether the chunk to be backed up has already been backed up by a previous back-up process. If the backup/restore application 124 matches the hash of the chunk just received to a previously received hash of a previously received chunk, then the backup/restore application 124 creates a pointer for the backup label for the backup currently being created to the previously stored chunk which has a hash that matches the hash of the chunk which was just received. Therefore, the backup/restore application 124 deduplicates the backup process by not sending or storing a chunk which matches a chunk which was previously sent and stored. FIG. 2 depicts a simplified example of a tree structure 200 for data chunks, which includes a first level 202, a second level 204, a third level 206, and a fourth level 208. The first level 202 indicates that the tree structure 200 is for storing data chunks for clients. The second level 204 of the tree structure 200 indicates that data chunks are stored for four specific clients. The third level 206 of the tree structure 200 indicates that four different backup labels exist for the four clients, which indicates that a total of four backup copies have been created for the data sets for the four clients. Pointer 210 from Client4 to Backuplabel4 indicates that Backuplabel4 was created for backing up a data set for Client4. The fourth level 208 of the tree structure 200 indicates that data chunks C, D, E, and F have been stored while creating the four backup copies for the data sets for the four clients. Pointer 212 from Backuplabel4 to data chunk F indicates that data chunk F was either created for backing up a data set for Backuplabel4 or the pointer 212 was added to Backuplabel4 because the deduplication process identified that data chunk F was already created by a previous backup process.

Consequently, the backup/restore application 124 has corresponding pointers or links to all of the corresponding data chunks for each backup, which enables the backup/restore application 124 to store the data chunks for any client and to use the data chunks to restore any client. A client process executing on any client may notify the backup/restore application 124 when the client process is backing up the dat file which specifies the backed-up version of the anti-virus software. The backup/restore application 124 may respond to this notice by storing the data chunk which includes the identified dat file and by recording the corresponding version of the anti-virus software in a data structure. Since the backup/restore application 124 may update the data structure on each occasion when a new data chunk including the most recent version of the anti-virus software is stored, the data structure may include a pointer to the data chunk which includes most recent version of the anti-virus software.

When a client process executing on a client notifies the backup/restore application 124 that it is restoring a data chunk which includes a dat file that specifies the backed-up version of anti-virus software, the backup/restore application 124 determines whether the data chunk includes the most recent version of the anti-virus software. If the data chunk includes the most recent version of the anti-virus software, the backup/restore application 124 uses the data chunk for restoring the corresponding client. If the data chunk does not include the most recent version of the anti-virus software, the backup/restore application 124 uses another data chunk which includes the most recent version of the anti-virus software for restoring the corresponding client. By identifying the version of the anti-virus software on each occasion when a data chunk includes a dat file which identifies the latest version of the anti-virus software, the backup/restore application 124 can identify the data chunk which stores the most recent version of the anti-virus software. The backup/restore application 124 insures that the most recent version of the anti-virus software is used to restore a client, even if the backup for the client includes an outdated version of the anti-virus software.

Figure 3:
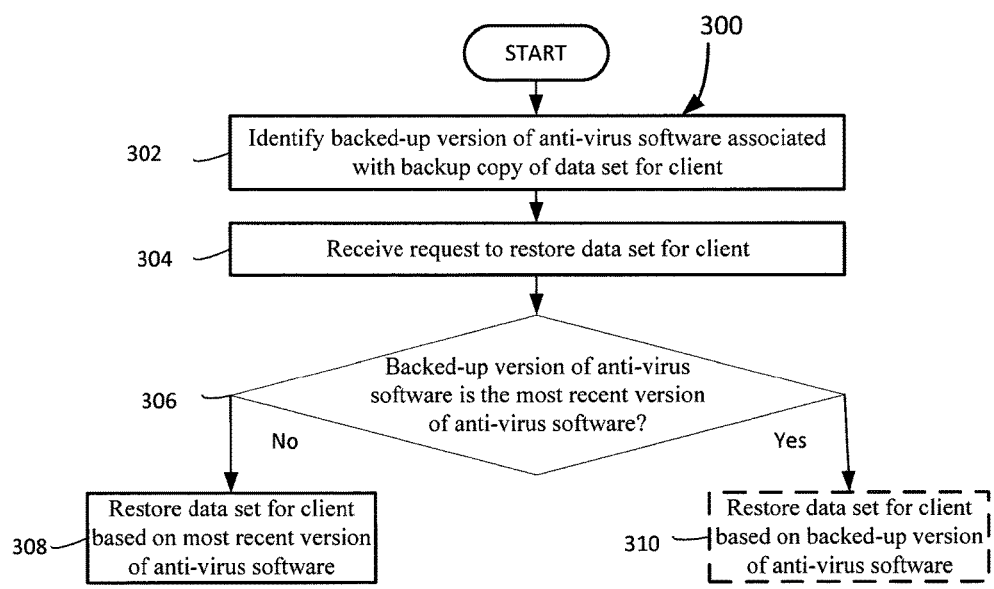
FIG. 3 is a flowchart that illustrates a method of protecting newly restored clients from computer viruses, under an embodiment.

FIG. 3 is a flowchart that illustrates a method for protecting newly restored clients from computer viruses, under an embodiment. Flowchart 300 illustrates method acts illustrated as flowchart blocks for certain steps involved in and/or between the clients 102-108 and/or the server 110 of FIG. 1.

A backed-up version is identified of anti-virus software associated with a backup copy of a data set for a client, block 302. For example, the backup/restore application 124 identifies a Jun. 29, 2014, version of anti-virus software while the backup/restore application 124 is creating a backup copy of the first data set 116 for the first virtual machine 112.

A request is received to restore a data set for a client, block 304. For example, the backup/restore application 124 receives a request to restore the first data set 116 for the first virtual machine 112.

A determination is made whether a backed-up version of anti-virus software is the most recent version of the anti-virus software, block 306. For example, the backup/restore application 124 determines whether the backed-up Jun. 29, 2014, version of the anti-virus software is the most recent version of the anti-virus software. If the backed-up version of the anti-virus software is not the most recent version of the anti-virus software, the flowchart 300 continues to block 308. If the backed-up version of the anti-virus software is the most recent version of the anti-virus software, the flowchart 300 proceeds to block 310.

A data set is restored for a client based on the most recent version of anti-virus software in response to a determination that a backed-up version of the anti-virus software is not the most recent version of the anti-virus software, block 308. For example, since the backed-up Jun. 29, 2014, version of the anti-virus software is not the most recent version of the anti-virus software, the backup/restore application 124 restores the first data set 116 for the first virtual machine 112 based on the most recent Jul. 3, 2014, version of the anti-virus software. Then the flowchart 300 restarts at block 302.

A data set is optionally restored for a client based on a backed-up version of anti-virus software in response to a determination that the backed-up version of the anti-virus software is the most recent version of the anti-virus software, block 310. For example, if the backed-up Jun. 29, 2014, version of the anti-virus software is the most recent version of the anti-virus software, the backup/restore application 124 restores the first data set 116 for the first virtual machine 112 based on the backed-up Jun. 29, 2014, version of the anti-virus software. Then the flowchart 300 restarts at block 302.

Although FIG. 3 depicts the blocks 302-310 occurring in a specific order, the blocks 302-310 may occur in another order. In other implementations, each of the blocks 302-310 may also be executed in combination with other blocks and/or some blocks may be divided into a different set of blocks.

Figure 4:
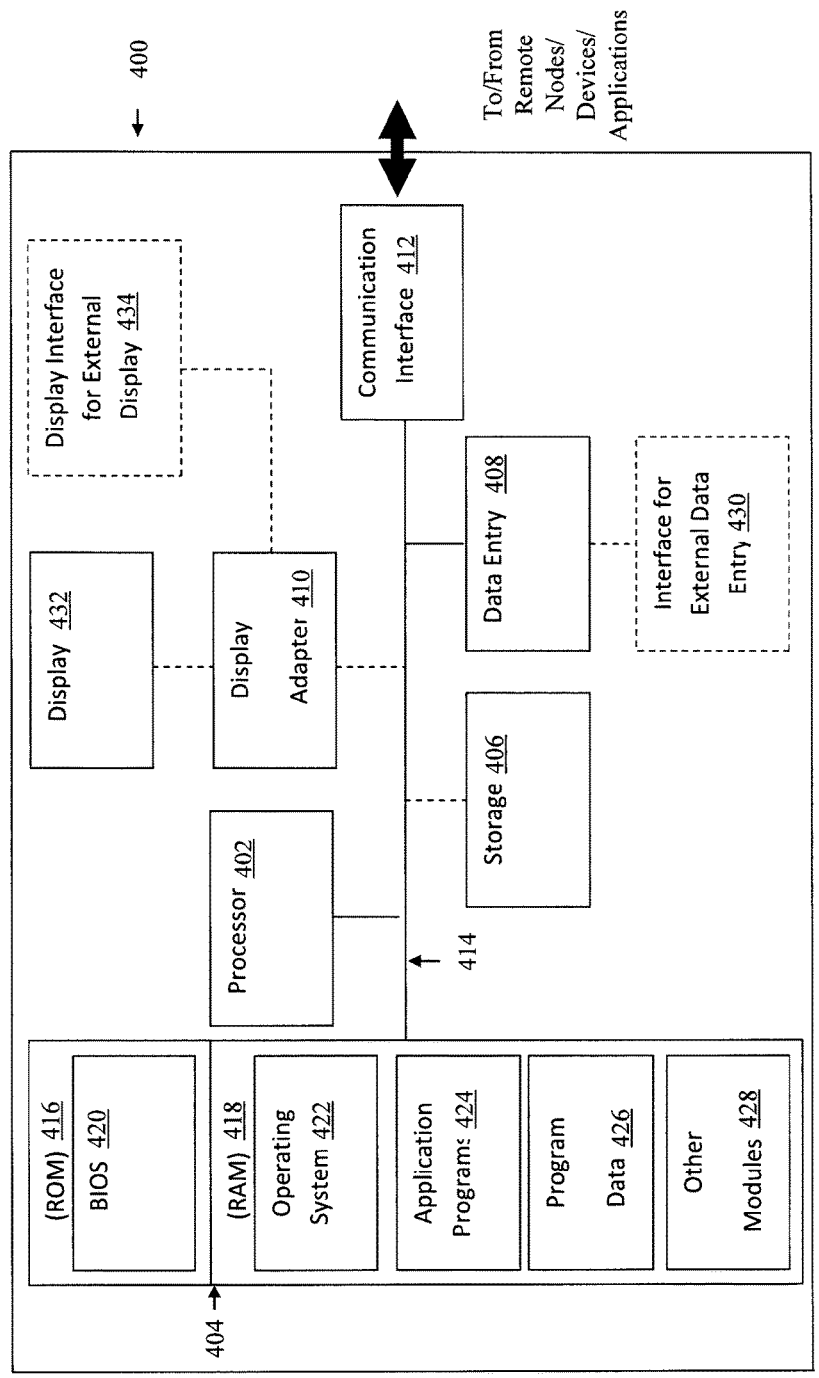
FIG. 4 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 4 may vary depending on the system implementation. With reference to FIG. 4, an exemplary system for implementing the subject matter disclosed herein includes a hardware device 400, including a processing unit 402, memory 404, storage 406, a data entry module 408, a display adapter 410, a communication interface 412, and a bus 414 that couples the elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in the memory 404 and/or the storage 406 and/or received via the data entry module 408.

The memory 404 may include read only memory (ROM) 416 and random access memory (RAM) 418. The memory 404 may be configured to store program instructions and data during operation of the hardware device 400. In various embodiments, the memory 404 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 404 may also include nonvolatile memory technologies such as nonvolatile flash RAM (NVRAM) or ROM. In some embodiments, it is contemplated that the memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in the ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 400.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 406, the ROM 416 or the RAM 418, including an operating system 422, one or more applications programs 424, program data 426, and other program modules 428. A user may enter commands and information into the hardware device 400 through the data entry module 408. The data entry module 408 may include mechanisms such as a keyboard, a touch screen, a pointing device, etc. Other external input devices (not shown) are connected to the hardware device 400 via an external data entry interface 430. By way of example and not limitation, external input devices may include a microphone, joystick, game pad, satellite dish, scanner, or the like. In some embodiments, external input devices may include video or audio input devices such as a video camera, a still camera, etc. The data entry module 408 may be configured to receive input from one or more users of the hardware device 400 and to deliver such input to the processing unit 402 and/or the memory 404 via the bus 414.

A display 432 is also connected to the bus 414 via the display adapter 410. The display 432 may be configured to display output of the hardware device 400 to one or more users. In some embodiments, a given device such as a touch screen, for example, may function as both the data entry module 408 and the display 432. External display devices may also be connected to the bus 414 via an external display interface 434. Other peripheral output devices, not shown, such as speakers and printers, may be connected to the hardware device 400.

The hardware device 400 may operate in a networked environment using logical connections to one or more remote nodes (not shown) via the communication interface 412. The remote node may be another computer, a server, a router, a peer device or other common network node, and typically includes many or all of the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 412 may include logic configured to support direct memory access (DMA) transfers between the memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 400 and other devices may be used.

It should be understood that the arrangement of the hardware device 400 illustrated in FIG. 4 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for protecting newly restored clients from computer viruses, the system comprising:
a processor-based application, which when executed on a computer, will cause the processor to:
identify a backed-up version of anti-virus software that is backed up to a first data chunk associated with a backup copy of a first data set for a first client;
receive a request to restore the first data set for the first client using the backup copy of the first data set;
determine whether the backed-up version of the anti-virus software that is backed up to the first data chunk associated with the backup copy of the first data set comprises a most recent version of the anti-virus software, the determining comprising:
identifying a backed-up version of the anti-virus software that is backed up to a second data chunk associated with a backup copy of a second data set for a second client; and
determining the most recent version of the anti-virus software by comparing the backed-up version of the anti-virus software that is backed up to the first data chunk of the first data set for the first client with the backed-up version of the anti-virus software that is backed up to the second data chunk of the second data set for the second client; and
restore, in response to a determination that the backed-up version of the anti-virus software that is backed up to the first data chunk does not comprise the most recent version of the anti-virus software, the first data set for the client with the backup copy of the first data set including obtaining the most recent version of the anti-virus software from the second data chunk of the second data set for the second client instead of from the first data chunk of the first data set for the first client.

2. The system of claim 1, wherein identifying the backed-up version of the anti-virus software that is backed up to the first data chunk associated with the backup copy of the first data set for the first client comprises one of identifying the backed-up version of the anti-virus software that is backed up to the first data chunk while creating the backup copy of the first data set for the first client and identifying the backed-up version of the anti-virus software that is backed up to the first data chunk after receiving the request to restore the first data set for the first client.

3. The system of claim 2, wherein creating each of the backup copy of the first data set for the first client and the backup copy of the second data set for the second client is associated with replicating a client as a virtual machine.

4. The system of claim 1, wherein the first and second client comprises a virtual machine.

5. The system of claim 1, wherein each of the backup copy of the first data set for the first client and the backup copy of the second data set for the second client comprises a deduplicated backup copy of a respective data set.

6. The system of claim 1, wherein determining whether the backed-up version of the anti-virus software that is backed up to the first data chunk comprises the most recent version of the anti-virus software comprises receiving at least a portion of the most recent version of the anti-virus software from a provider of the anti-virus software.

7. The system of claim 1, wherein the processor-based application, when executed, will further cause the processor to restore the first data set for the first client based on the backed-up version of the anti-virus software that is backed up to the first data chunk in response to a determination that the backed-up version of the anti-virus software that is backed up to the first data chunk comprises the most recent version of the anti-virus software.

8. The system of claim 1, wherein the processor-based application, when executed, will further cause the processor to:
maintain a data structure recording a version of backed-up anti-virus software stored in data chunks for one or more backups, the data structure including a pointer to a data chunk storing the most recent version of the anti-virus software; and
update, in response to performing a backup for a third client, the data structure to record the version of backed-up anti-virus software stored in a third data chunk for the third client.

9. A computer-implemented method for protecting newly restored clients from computer viruses, the method comprising:
identifying a backed-up version of anti-virus software that is backed up to a data chunk associated with a backup copy of a data set for a client;
receiving a request to restore the data set for the client using the backup copy of the data set;
determining whether the backed-up version of the anti-virus software that is backed up to the data chunk associated with the backup copy of the data set comprises a most recent version of the anti-virus software, the determining comprising:
identifying a backed-up version of the anti-virus software that is backed up to a second data chunk associated with a backup copy of a second data set for a second client; and
determining the most recent version of the anti-virus software by comparing the backed-up version of the anti-virus software that is backed up to the first data chunk of the first data set for the first client with the backed-up version of the anti-virus software that is backed up to the second data chunk of the second data set for the second client; and
restoring, in response to a determination that the backed-up version of the anti-virus software that is backed up to the first data chunk does not comprise the most recent version of the anti-virus software, the first data set for the client with the backup copy of the first data set including obtaining the most recent version of the anti-virus software from the second data chunk of the second data set for the second client instead of from the first data chunk of the first data set for the first client.

10. The method of claim 9, wherein identifying the backed-up version of the anti-virus software that is backed up to the first data chunk associated with the backup copy of the first data set for the first client comprises one of identifying the backed-up version of the anti-virus software that is backed up to the first data chunk while creating the backup copy of the first data set for the first client and identifying the backed-up version of the anti-virus software that is backed up to the first data chunk after receiving the request to restore the first data set for the first client, wherein creating each of the backup copy of the first data set for the first client and the backup copy of the second data set for the second client is associated with replicating a client as a virtual machine.

11. The method of claim 9, wherein the first and second client comprises a virtual machine.

12. The method of claim 9, wherein each of the backup copy of the first data set for the first client and the backup copy of the second data set for the second client comprises a deduplicated backup copy of a respective data set.

13. The method of claim 9, wherein determining whether the backed-up version of the anti-virus software that is backed up to the first data chunk comprises the most recent version of the anti-virus software comprises receiving at least a portion of the most recent version of the anti-virus software from a provider of the anti-virus software.

14. The method of claim 9, wherein the method further comprises restoring the first data set for the first client based on the backed-up version of the anti-virus software that is backed up to the first data chunk in response to a determination that the backed-up version of the anti-virus software that is backed up to the first data chunk comprises the most recent version of the anti-virus software.

15. A computer program product, comprising a non-transitory computer-readable medium having a computer-readable program code embodied therein to be executed by one or more processors, the program code including instructions to:
    identify a backed-up version of anti-virus software that is backed up to a first data chunk associated with a backup copy of a first data set for a first client;
    receive a request to restore the first data set for the first client using the backup copy of the first data set;
    determine whether the backed-up version of the anti-virus software that is backed up to the first data chunk associated with the backup copy of the first data set comprises a most recent version of the anti-virus software, the determining comprising:
        identifying a backed-up version of the anti-virus software that is backed up to a second data chunk associated with a backup copy of a second data set for a second client; and
        determining the most recent version of the anti-virus software by comparing the backed-up version of the anti-virus software that is backed up to the first data chunk of the first data set for the first client with the backed-up version of the anti-virus software that is backed up to the second data chunk of the second data set for the second client; and
    restore, in response to a determination that the backed-up version of the anti-virus software that is backed up to the first data chunk does not comprise the most recent version of the anti-virus software, the first data set for the client with the backup copy of the first data set including obtaining the most recent version of the anti-virus software from the second data chunk of the second data set for the second client instead of from the first data chunk of the first data set for the first client.

16. The computer program product of claim 15, wherein identifying the backed-up version of the anti-virus software that is backed up to the first data chunk associated with the backup copy of the first data set for the first client comprises one of identifying the backed-up version of the anti-virus software that is backed up to the first data chunk while creating the backup copy of the first data set for the first client and identifying the backed-up version of the anti-virus software that is backed up to the first data chunk after receiving the request to restore the first data set for the first client.

17. The computer program product of claim 16, wherein creating each of the backup copy of the first data set for the first client and the backup copy of the second data set for the second client is associated with replicating a client as a virtual machine.

18. The computer program product of claim 15, wherein the first and second client comprises a virtual machine.

19. The computer program product of claim 15, wherein each of the backup copy of the first data set for the first client and the backup copy of the second data set for the second client comprises a deduplicated backup copy of a respective data set.

20. The computer program product of claim 15, wherein
    determining whether the backed-up version of the anti-virus software that is backed up to the first data chunk comprises the most recent version of the anti-virus software comprises receiving at least a portion of the most recent version of the anti-virus software from a provider of the anti-virus software.

21. The computer program product of claim 15, wherein the program code further includes instructions to restore the first data set for the first client based on the backed-up version of the anti-virus software that is backed up to the first data chunk in response to a determination that the backed-up version of the anti-virus software that is backed up to the first data chunk comprises the most recent version of the anti-virus software.

* * * * *